(12) United States Patent
Lee et al.

(10) Patent No.: US 8,421,956 B2
(45) Date of Patent: Apr. 16, 2013

(54) COMPOSITE COLOR SEPARATION SYSTEM

(75) Inventors: Chi-Hung Lee, Hsinchu County (TW); Hui-Hsiung Lin, Hsinchu County (TW); Po-Chou Chen, Changhua County (TW); Cheng-Huan Chen, Taoyuan County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 267 days.

(21) Appl. No.: 12/913,449

(22) Filed: Oct. 27, 2010

(65) Prior Publication Data

US 2011/0242457 A1    Oct. 6, 2011

(30) Foreign Application Priority Data

Apr. 1, 2010    (TW) .............................. 99110073 A

(51) Int. Cl.
*G02F 1/1335* (2006.01)
(52) U.S. Cl.
USPC ............................................. 349/62; 349/65
(58) Field of Classification Search ............ 349/62, 349/65, 57, 95
See application file for complete search history.

(56) References Cited

U.S. PATENT DOCUMENTS

| | | | |
|---|---|---|---|
| 4,807,978 A | 2/1989 | Grinberg et al. | |
| 5,187,599 A * | 2/1993 | Nakanishi et al. | 349/95 |
| 5,613,022 A | 3/1997 | Odhner et al. | |
| 5,615,024 A | 3/1997 | May et al. | |
| 5,764,389 A | 6/1998 | Grinberg et al. | |
| 8,040,458 B2 * | 10/2011 | Nagata et al. | 349/62 |
| 2004/0017347 A1 | 1/2004 | Hougham et al. | |
| 2007/0040950 A1 | 2/2007 | Jung | |
| 2008/0112052 A1 | 5/2008 | Taira et al. | |
| 2009/0190072 A1 | 7/2009 | Nagata et al. | |

FOREIGN PATENT DOCUMENTS

| | | |
|---|---|---|
| EP | 1726977 A1 | 11/2006 |
| JP | 05249318 | 9/1993 |
| JP | 10247411 A | 9/1998 |
| JP | 11258604 | 9/1999 |
| JP | 2004022223 | 1/2004 |

(Continued)

OTHER PUBLICATIONS

Korean Intellectual Property Office, "Office Action", Dec. 26, 2011, Korea.

(Continued)

*Primary Examiner* — James Dudek
(74) *Attorney, Agent, or Firm* — Morris Manning & Martin LLP; Tim Tingkang Xia, Esq.

(57) ABSTRACT

A composite color separation system, comprises: a light control module, a light guide module and a light splitting module. The light control module has a lighting unit and a lens unit, in which the lighting unit includes an array of lighting elements whereas there are at least two types of lighting elements in the array for emitting at least two beams of different wavelengths. The light from the lighting unit is directed to enter the lens unit before being discharged out of the light control module. The light guide module comprises: a first light incident surface, for receiving the beams from the light control module; a first light emergence surface; and a light guide structure, for guiding the beams to the first light emergence surface where they are discharged out of the light guide module to the light splitting module. The light splitting module is used for splitting the beams.

13 Claims, 8 Drawing Sheets

FOREIGN PATENT DOCUMENTS

| | | |
|---|---|---|
| JP | 2004303441 A | 10/2004 |
| JP | 2005062692 | 3/2005 |
| JP | 2005276734 A | 10/2005 |
| KR | 20030097333 A | 12/2003 |
| KR | 20070020725 A | 2/2007 |
| TW | 249217 B | 2/2006 |
| WO | 02090826 A1 | 11/2002 |

OTHER PUBLICATIONS

F. Yamada, et al., 19-1:Dual Layered Very Thin Flat Surface Micro Prism Array Directly Molded in an LCD Cell, Eurodisplay 2002, pp. 339-342, Japan.

Roberto Caputo, et al., Short period holographic structures for backlight display applications, Optics Express, Aug. 20, 2007, pp. 10540-10552, vol. 15, No. 17, Optical Society of America.

Yoichi Taira, et al., 43.1 :Color Filterless Liquid Crystal Display Illuminated with LEDs, SID 03 Digest, 2003, pp. 1250-1253.

Martin J. J. Jak et al., Color-separating backlight for improved LCD efficiency, Journal of the SID, 2008, P803-810, vol. 16, No. 8.

Japan Patent Office, "Office Action", May 22, 2012, Japan.

Po-Chou Chen et al., Color separation system with angularly positioned light source module for pixelized backlighting, Optics Express, 2010, p. 645-655, vol. 18, No. 2.

\* cited by examiner

COMPOSITE COLOR SEPARATION SYSTEM

CROSS-REFERENCE TO RELATED APPLICATIONS

This non-provisional application claims priority under 35 U.S.C. §119(a) on Patent Application No(s). 099110073 filed in Taiwan, R.O.C. on Apr. 1, 2010, the entire contents of which are hereby incorporated by reference.

TECHNICAL FIELD

The present disclosure relates to a composite color separation system, and more particularly, to a color separation system capable of acting in replacement of the conventional color filters (CF) used in optical devices, such as display panels, image sensors and color camcorders, for its simplicity and high optical efficiency.

TECHNICAL BACKGROUND

In a flat display, a backlight source is often used in combination with a spatial light modulator and a color filter to present full-color images. In an image sensor of a digital camera, a color filter is also used in combination with color difference calculation to reproduce the color of an original object. In larger systems such as a color video camera or a back projection TV, a three-plate or two-plate prism set or a color filter is used in combination with a collimated light source to present full-color images. When the color filter is used in such systems, because each shading pixel can only present a single primary color of the RGB three primary colors, about two-thirds of energy of the incident white light is absorbed, thus decreasing the efficiency of using the light and shortening the lifespan of the battery. In addition, fabrication of the color filter can be rather complex and more than one semiconductor photolithography processes are needed for each primary color, which results in a high cost.

Please refer to FIG. 1 to FIG. 3, which show a common light separation architecture used in conventional color camcorders. There are three types of light separation architectures, which are a three-plate prism-type optical system composed of a zoom lens 1, an infrared filter 2, a three-plate prism 3, a red light charge-coupled device (CCD) 4, a green light CCD 5, and a blue light CCD 6, as shown in FIG. 1; a two-plate dichroic prism-type optical system composed of a zoom lens 1, an infrared filter 2, a two-plate prism 7, a red-blue filter 8, a red-blue light CCD 9, a green light CCD 5, as shown in FIG. 2; and an optical system with single-plate color filter composed of a zoom lens 1, an infrared filter 2, a red-green-blue filter 10 and a red-green-blue light CCD 11, as shown in FIG. 3 Among which, both the optical systems shown in FIG. 1 and FIG. 2, that are designed to achieve light separation by the use of their prisms and optical interference films, are disadvantageous in their bulky sizes and complex structures with plenty of optical elements required. However, the optical structure shown in FIG. 3, which directly uses a color filter for light separation, can be suffered by its low optical efficiency.

Therefore, researchers all over the world are working tirelessly to come up with all kinds of new techniques for overcoming the aforesaid shortages. One such study is disclosed in a paper published in Journal of SID 16/8, 2008, by Philips Co., and also in a paper published in EURODISPLAY 2002, pages 339~342, by IBM, both of which use a sub-wavelength structure for splitting an incident beam into multiple beams of various colors and then enable the resulting beams to be focused on their corresponding sub-pixels by the use of a micro-lens array, so that cooperatively are capable of working as a substitute for the conventional dye photoresist. However, they both suffer the following shortcomings:

(1) it is not a easy task for producing a large-area sub-wavelength structure whose pitch is about 320 nm;

(2) the resulting light emitting thereby has poor uniformity; and (3) high production cost.

Moreover, in U.S. Pat. No. 5,615,024A, entitled "Color Display Device with Chirped Diffraction Gratings", a blazed diffraction grating capable of acting in replacement of color filters for separating an incident beam into beams of primary colors is disclosed, in which the resulting beams are primarily first order diffraction beams. Accordingly, when the aforesaid structure is applied in display panels, the beam of one primary color should be directed to correspond to one pixel. However, by the usage of the first order diffraction beams, a large included angle will be formed between its incident beam and emitting beam so that the incident beam must be directed to enter the blazed grating by a larger angle so as to enable the resulting emitting beam to enter its liquid crystal layer following the normal of the same. On the other hand, if the incident beam enter the blazed grating perpendicularly, it will result the emitting beam to enter the liquid crystal layer in a large angle which will require to have additional refraction elements for correcting the deviation, otherwise, it can not be applied in thin display panels.

In U.S. Pat. No. 4,807,978, entitled "Color Display Device and Method Using Holographic Lenses", a holographic lens set capable of acting in replacement of color filters for separating an incident beam into beams of primary colors is disclosed, in which the resulting beams are primarily first order diffraction beams. Accordingly, when the aforesaid structure is applied in display panels, the beam of one primary color should be designed to correspond to one pixel. As the color separation in the aforesaid U.S. patent requires the holographic lens set to be composed of three layers of holographic lenses, not only it is extremely difficult to fabricate, but also it is difficult to align the lens arrays precisely with respect to each other. In addition, as there is severe cross talk between the resulting beams of three primary colors, the use of such holographic lenses in color display device will suffer high noise.

In U.S. Pat. No. 5,764,389, entitled "Holographic Color Filters for Display Applications, and Operating Method", a holographic set capable of acting in replacement of color filters for separating an incident beam into beams of primary colors is disclosed, in which first an incident beam is separated into beams of different spectral regions corresponding to the three primary colors by the use of a holographic color filter, and then another holographic color filter is used for deflecting the optical paths of the resulting beams in a manner that the beam of one primary color is directed to correspond to one pixel. Similarly, since there are multiple layers of holographic color filters used for achieving the color separation, not only the optical efficiency is poor, but also it is difficult to align the holographic color filters precisely with respect to each other.

In the image sensor disclosed in TW Pat. No. M249217, a set of lenses is used in cooperation with a prism set, as a substitute to color filters, for separating an incident beam into beams of primary colors while deflecting the optical paths of the resulting beams in a manner that the beam of one primary color is directed to correspond to one pixel. As the lens set is disposed on the prism set and the shape of the prism is comparatively unsymmetrical with respect to the optical field of the image sensor, it is practically infeasible despite of its good optical efficiency.

Therefore, it is in need of a color separation system capable of acting in replacement of the conventional color filters for its simplicity and high optical efficiency. In addition, the color separation system should be able to separating an incident beam into a red, a green and a blue light beam that are directed to enter a liquid crystal layer of a display panel in a vertical manner with satisfactory optical efficiency.

TECHNICAL SUMMARY

Accordingly, the present disclosure is directed to a color separation system capable of acting in replacement of the conventional color filters used in optical devices, such as display panels, image sensors and color camcorders, for its simplicity and high optical efficiency.

The present disclosure provides a composite color separation system, which comprises:
- a light control module, configured with at least one lighting unit and at least one lens unit, while enabling each lighting unit to be formed as an array of symmetrically disposed lighting elements and each array to be composed of at least two types of lighting elements so as to enable each lighting unit to emit correspondingly at least two types of incident beams of different wavelengths to its corresponding lens unit and then out of the light control module;
- a light guide module, configured with a first light incident surface, a light guide structure and a first light emergence surface in a manner that the first light incident surface is provided for receiving the plural incident beams from the light control module; and the light guide structure is used for guiding the plural incident beams to the first light emergence surface where they are discharged out of the light guide module; and
- a light splitting module, for receiving and splitting the plural incident beams from the light guide module and then projecting the split beams out of the light splitting module.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
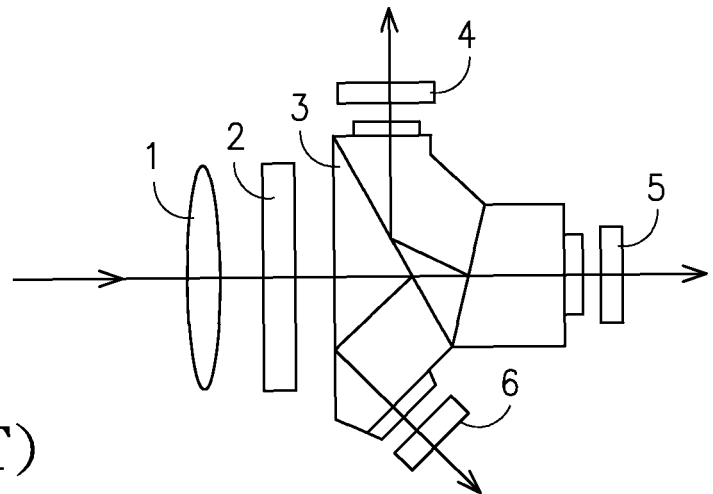
FIG. 1 is a schematic diagram showing a conventional three-plate prism-type optical system.
Figure 2:
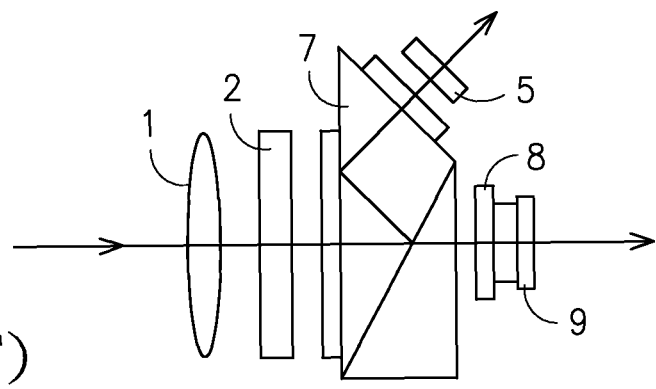
FIG. 2 is a schematic diagram showing a conventional two-plate dichroic prism-type optical system.
Figure 3:
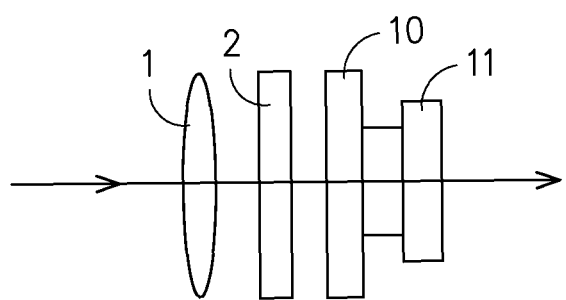
FIG. 3 is a schematic diagram showing a conventional optical system with single-plate color filter.
Figure 4:
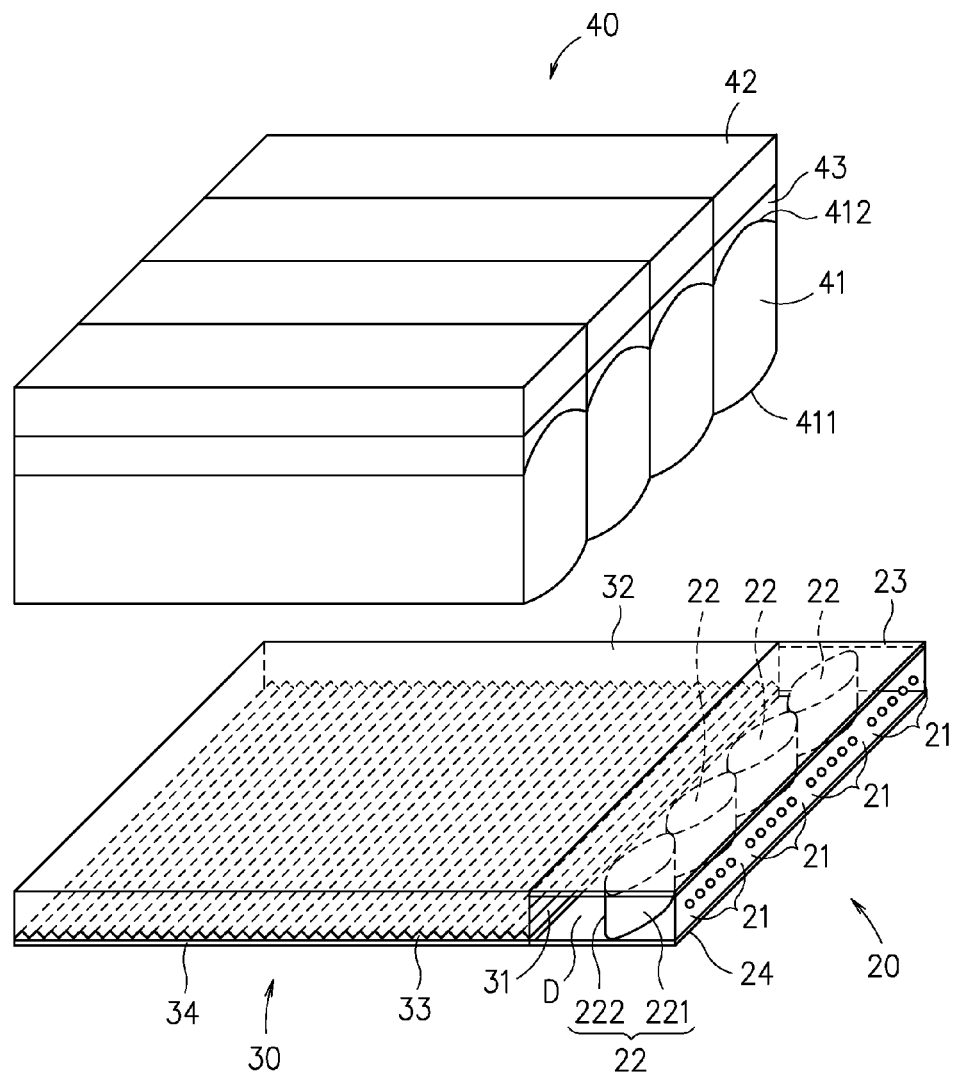
FIG. 4 is a three-dimensional view of a composite color separation system according to an embodiment of the present disclosure.

Please refer to FIG. 4, which is a three-dimensional view of a composite color separation system according to an embodiment of the present disclosure. In FIG. 4, the composite color separation system is comprised of: a light control module 20, a light guide module 30 and a light splitting module 40, in which the light control module 20 is used for collimating or converging a plurality of incident beams of various wavelengths to the light guide module 30 by different incident angles; the light guide module 30, being configured with a first light incident surface 31 and a first light emergence surface 32, is used for guiding the plural incident beams entering therein from the light control module 20 to the first light emergence surface 2 where they are discharged out of the light guide module 30 and then enter the light splitting module 40; and the light splitting module 40 is used for enabling the received beams to travel in a specified direction or respectively toward a specified location.

Figure 5:
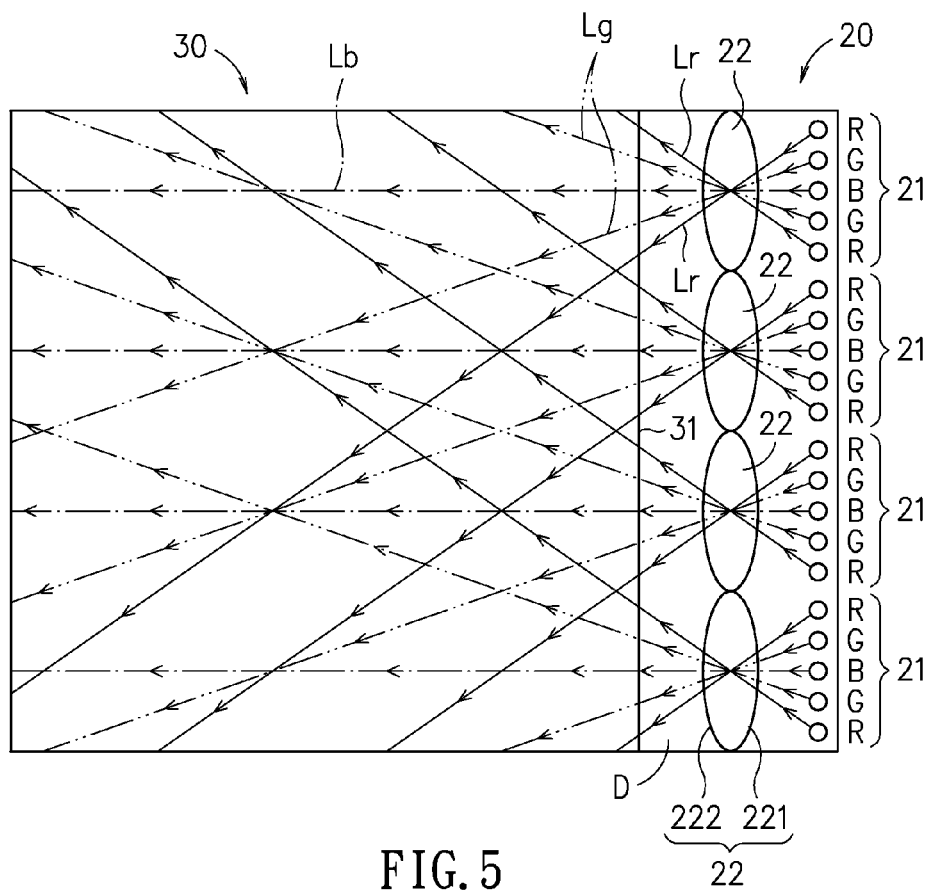
FIG. 5 is a top view of a light control module with biconvex lens units according to a first embodiment of the disclosure that illustrates the optical paths of the incident beams traveling from the light control module to the light guide module.
Figure 6:
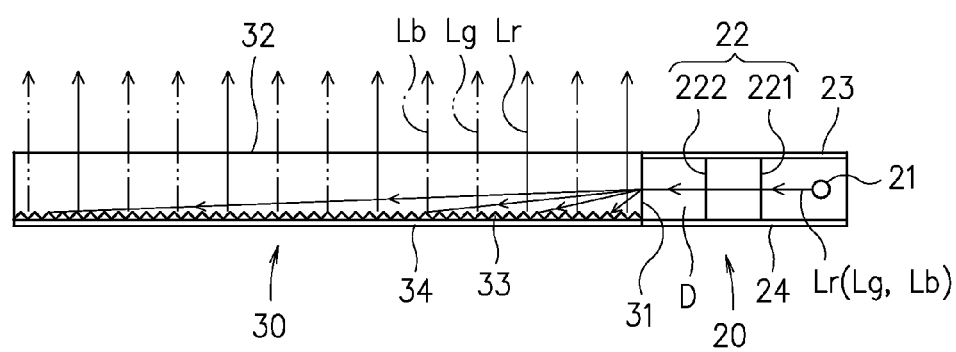
FIG. 6 is a side of the light control module with biconvex lens units of FIG. 5 that illustrates the optical paths of the incident beams traveling from the light control module to the light guide module.

As the embodiment shown in FIG. 4 to FIG. 6, the light control module 20 is configured with four lighting units 21 and four lens units 22 in a one-on-one manner, wherein each lighting unit is an array of five lighting elements. Moreover, In the exemplary embodiment, the periods of the lighting units 21 and the lens units 22 are ranged between 100 μm and 1500 μm, but they can be determined according to actual requirement and thus are not limited thereby.

In addition, each of the lighting units 21 is composed of a plurality of symmetrically disposed lighting elements that the lighting unit can be any type of light source, only if it is a collimated light source capable of emitting a visible beams whose wavelength is ranged between 400 nm and 650 nm, such as a laser source. In this embodiment, each of the lighting unit 21 is composed of two red-light LEDs, two green-light LEDs and one blue-light LED, representing as R, G, and B in FIG. 5. In this embodiment, the blue-light LED is used for emitting a first incident beam Lb of a first wavelength, each of the green LEDs is used for emitting a second incident beam Lg of a second wavelength, and each of the red-light LEDs is used for emitting a third incident beam Lr of a third wavelength. In addition, in each lighting unit 21 shown in FIG. 5, the blue-light LED is being arranged at the center while enabling the two red-light LEDs and the two green-light LEDs to be arranged symmetrically at the two opposite sides of the blue-light LED. In detail, the two green-light LEDs are respectively and symmetrically arranged at the two opposite sides of the blue-light LED, whereas the two red-light LEDs are being respectively and symmetrically arranged at the outer sides of their corresponding green-light LEDs that are away from the blue-light LED. Accordingly, the blue-light LED, the two green-light LEDs and the two red-light LEDs are symmetrically arranged in the lighting unit 21 while allowing the two red-light LEDs to be arranged at the outermost locations, and thereby, the first incident beam Lb from the blue-light LED, the second incident beams Lg from the green-light LEDs and the third incident beams Lr from the red-light LEDs are projected toward their corresponding lens unit 22 while allowing the incident angle of each of the incident beams with respect to the optical axis of its corresponding lens unit 22 to be ranged between −45 degrees and +45 degrees. It is noted that the range of the incident angle can be varied according to actual requirement, and thus is not limited thereby.

In this embodiment, each of the lens units 22 can be made of a transparent lens having a refraction microstructures or diffraction microstructures formed thereon, and the refractive indexes of the lens unit 22 should be ranged between 1.35 and 1.65. As the embodiment shown in FIG. 5, each of the lens units 22 is a biconvex lens configured with a second light incident surface 221 and a second light emergence surface 222. Accordingly, the first incident beam Lb, the second incident beams Lg and the third incident beams Lr that are projected to the lens unit 22 will enter the lens unit 22 through the second light incident surface 221 and then out of the same through the second light emergence surface 222. It is noted that there is a gap D formed between the second light emergence surface 222 and the first light incident surface 31 of the light guide module 30, whereas the gap is filled with air whose refractive index is about 1.0. Thereby, the first incident beam Lb, the second incident beams Lg and the third incident beams Lr can be collimated and converged by the lens units 22 in a manner that they are respectively projected to enter the light guide module 30 by different incident angles.

In addition, the light control module 20 further comprises a first reflective structure, which includes a first reflection panel 23 and a second reflection panel 24 that are disposed respectively covering a top surface and a bottom surface of the light control module 20, as shown in FIG. 4 and FIG. 6. By the reflection of the first reflection panel 23 and the second reflection panel 24, the amount of the plural incident beams including the first incident beam Lb, the second incident beams Lg and the third incident beams Lr, that are reflected and thus projected toward and passing the lens units 22 is increased so that the light harvesting efficiency is increased. Nevertheless, the arrangement of the first reflective structure is dependent upon actual requirement, that it can be arranged at a side of the light control module 20 and is not being limited to be configured with the aforesaid first reflection panel 23 and the second reflection panel 24 that are disposed respectively covering the top and bottom of the light control module 20.

As shown in FIG. 4 to FIG. 6, in addition to the first light incident surface 31 and the first light emergence surface 32, the light guide module 30 is further configured with a light guide structure 33. The light guide structure can be a structure of reflection/refraction microstructures or a structure of V-shaped grooves that are capable of guiding the first incident beam Lb, the second incident beams Lg and the third incident beams Lr to the first light emergence surface 32 enabling those to be discharged thereout in a direction parallel with the normal direction of the first light emergence surface 32 of the light guide module, i.e. in a direction perpendicular to the first light emergence surface 32 as shown in FIG. 6.

There is no restriction relating to where the light guide structure 33 should be located and also there is no restriction relating to its light guiding direction. In this embodiment the first light incident surface 31 is position to the right of the light guide module 30 and the first light emergence surface 32 is arranged at the top of the light guide module 30 while enabling the first light incident surface 31 and the first light emergence surface 32 to be positioned perpendicular to each other, and consequently, the light guide structure 33 is disposed on a surface corresponding to the first light emergence surface 32, that is, it is disposed on the bottom of the light guide module 30. Accordingly, as soon as first incident beam Lb, the second incident beams Lg and the third incident beams Lr are projected entering the light guide module 30 through the first light incident surface 31 that is substantially the right side of the light guide module 31, they will be reflected by the light guide structure toward the first light emergence surface 32 where they are discharged out of the light guide module 30 and then entering the light splitting module 40, as shown in FIG. 4. Thereafter, by the light splitting module 40, the first incident beam Lb, the second incident beams Lg and the third incident beams Lr are enabled to travel in a specified direction or respectively toward a specified location.

From the above description, it is noted that the first light incident surface 31, the first light emergence surface 2 and the light guide structure 33 can be disposed at positions corresponding to each other that are determined according to actual requirement and thus are not restricted by any specification, which is also true for the light guiding direction of the light guide structure. Moreover, the light guide module 30 can be further configured with a second reflective structure, which is substantially a third reflection panel 34 arranged at the bottom of the light guide module 30, i.e. it is disposed at a surface of the light guide module 30 opposite to the first light emergence surface 32. In this embodiment, the first light emergence surface 32 is arranged at the top of the light guide module 30 and thus the third reflection panel 34 is arranged at the bottom of the light guide module 30. Consequently, by the reflection of the third reflection panel 34, the amount of the plural incident beams including the first incident beam Lb, the second incident beams Lg and the third incident beams Lr, that are reflected and thus projected toward the first light emergence surface 32 is increased so that the light harvesting efficiency is increased. Similarly, the arrangement of the second reflective structure is dependent upon actual requirement, that it can be arranged at a side of the light guide module 30 and is not being limited to be arranged at the bottom of the light guide module 30. Moreover, the third reflection panel 34 can be integrally formed with the second reflection panel 24.

Figure 7:
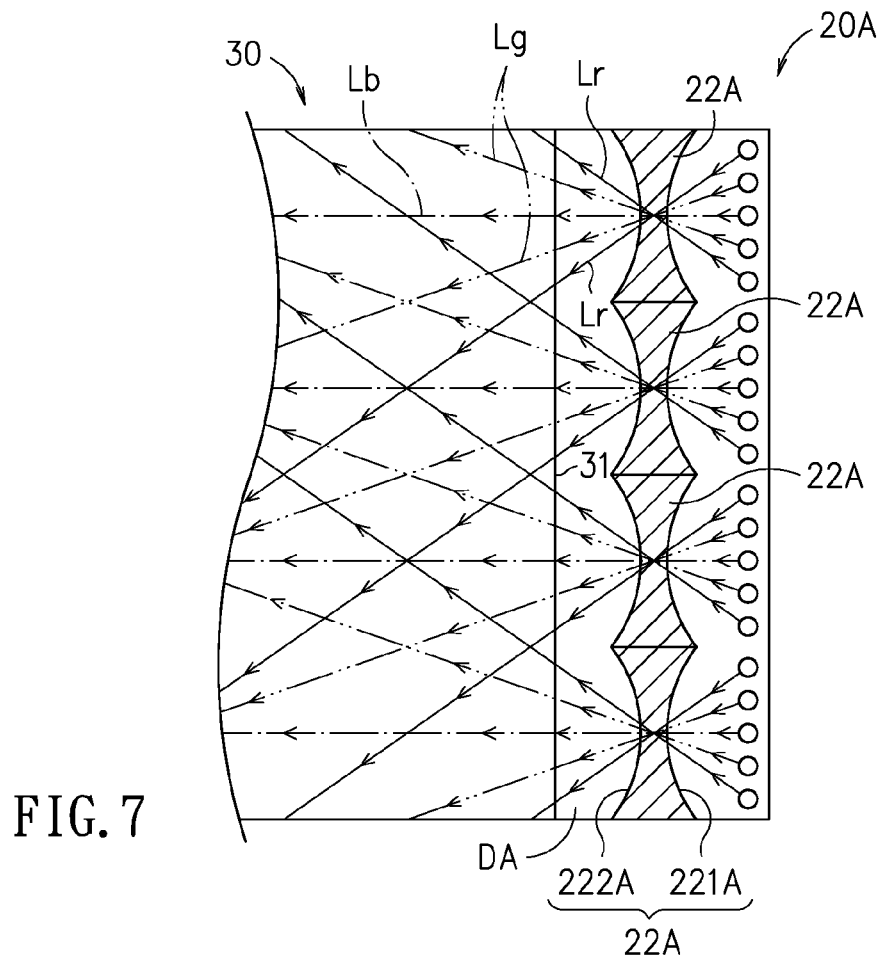
FIG. 7 is a top view of a light control module with biconcave lens units according to a second embodiment of the disclosure.

Please refer to FIG. 7, which is a top view of a light control module with biconcave lens units according to a second embodiment of the disclosure. In this embodiment, each of the lens units 22A in the light control module 20A is a biconcave lens, and similarly the biconcave lens is configured with a second light incident surface 221A and a second light emergence surface 222A. Thereby, the first incident beam Lb, the second incident beams Lg and the third incident beams Lr are projected entering the lens unit 22A through the second light incident surface 221A and then are discharged out of the same through the second light emergence surface 222A. It is noted that that there is a gap DA formed between the second light emergence surface 222A and the first light incident surface 31 of the light guide module 30, whereas the gap is filled with air whose refractive index is about 1.0. In addition, each of the lens units 22A can be made of a transparent lens having a refraction microstructures or diffraction microstructures formed thereon, and the refractive indexes of the lens unit 22A should be ranged between 1.35 and 1.65. The lens units in the abovementioned two embodiments are used for converging the incident beams while controlling the incident angles of those incident beams entering the light guide module, and therefore, the types of the lens units can be varied that are not limited by the aforesaid embodiments.

Figure 8:
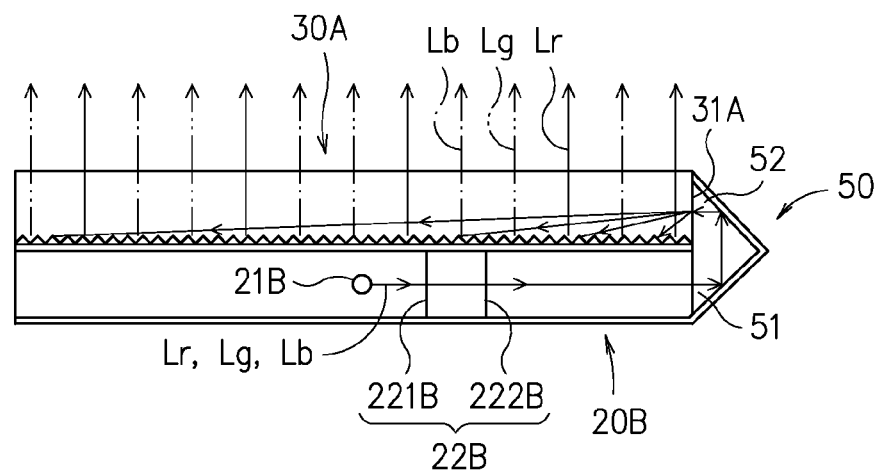
FIG. 8 is a side view of an assembly of a light control module and a light guide module that is attached with a reflective structure according to the present disclosure.

Please refer to FIG. 8, which is a side view of an assembly of a light control module and a light guide module that is attached with a reflective structure according to the present disclosure. In the embodiment shown in FIG. 8, the light guide module 30A is stacked on top of the light control module 20B. As shown in FIG. 8, the light control module 20B is configured with a lighting unit 21 and a lens unit 22B, in which the lens unit 22B is formed with a second light incident surface 221B and a second light emergence surface 222B, and the lighting unit 21B is comprised of a plurality of collimated lighting elements that are symmetrically disposed in a manner similar to the lighting unit 21 of FIG. 5. Moreover, the lighting unit 21 is capable of emitting a plurality of incident beams of different wavelengths, including the first incident beam Lb, the second incident beams Lg and the third incident beams Lr, while enabling those beams to enter the lens unit 22B through the second light incident surface 221B, and then project out of the lens unit 22B through the second light emergence surface 222B. Moreover, there is a reflective structure 50 disposed at a position between the light control module 20B and the light guide module 30A to be used for directing the first incident beam Lb, the second incident beams Lg and the third incident beams Lr to the light guide module 30A disposed on top of the light control module 20B. As shown in FIG. 8, the reflective structure 50 is configured with an optical entrance 51 and an optical exit 52, in that the optical entrance 51 is used for receiving the first incident beam Lb, the second incident beams Lg and the third incident beams Lr from the light control module 20B; and the optical exit 52 is used for projecting and guiding the first incident beam Lb, the second incident beams Lg and the third incident beams Lr that are reflected by the reflective structure 50 out of the reflective structure 50 and then onto the first light incident surface 31A of the light guide module 30A. It is noted that the arrangement of the light control module as well as the light guide module can be designed according to actual requirement, and thus are not limited by the aforesaid embodiment.

Figure 9:
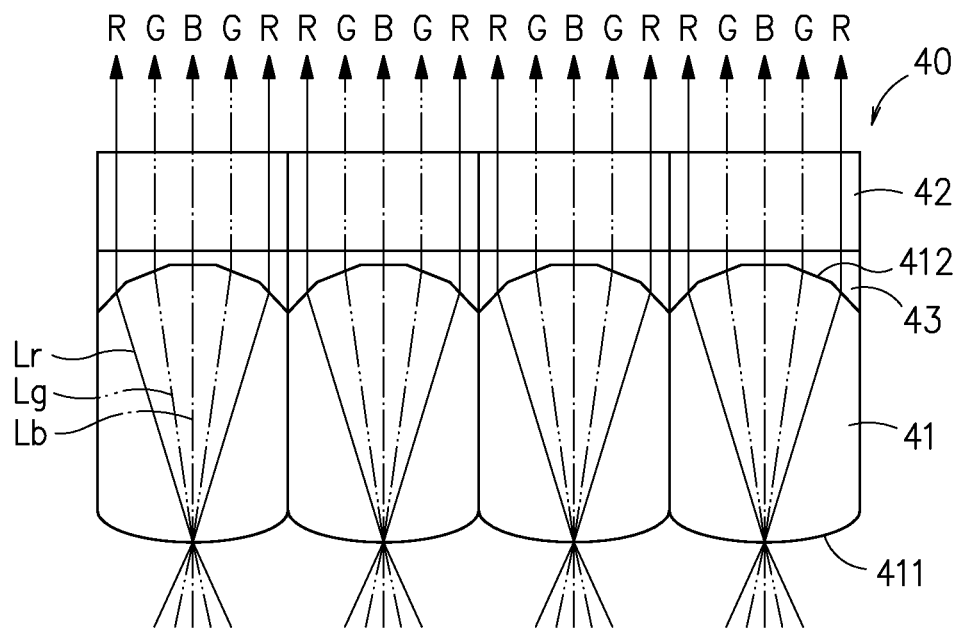
FIG. 9 is a side view of a light splitting module according to a first embodiment of the invention.

As shown in FIG. 4 and FIG. 9, the light splitting module 40 is further comprised of: a first beam splitting plate 41 and a liquid crystal layer 42, in which the first beam splitting plate 41 is adhered to the liquid crystal layer 42 by the use of an adhesive 43. In this embodiment, the refractive index of the first beam splitting plate 41 is ranged between 1.35 and 1.65, while the refractive index of the adhesive 43 is ranged between 1.3 and 1.58. Moreover, the first beam splitting plate 41 is formed with a third light incident surface 411 and a third light emergence surface 412, in that the third light incident surface 411 is formed with periodic spherical refraction microstructures while the third light emergence surface 412 is formed with periodic refraction microstructures. Thereby, the first incident beam Lb, the second incident beams Lg and the third incident beams Lr from the first light emergence surface 32 of the light guide module 30 are projected onto the third light incident surface 411 where they are converged and then being directed to the third light emergence surface 412, at which the optical paths of the first incident beam Lb, the second incident beams Lg and the third incident beams Lr are deflected toward the liquid crystal layer 42 in positions respectively corresponding with multiple sub-pixels thereof, as the positions R, G, and B indicated in the FIG. 9, while being enabled to be discharged thereout in a direction parallel with the normal direction of the first light emergence surface 32 of the light guide module 30 and then entering sequentially into the adhesive 43, the liquid crystal layer 42, and thereafter out of the liquid crystal layer 42.

Figure 10:
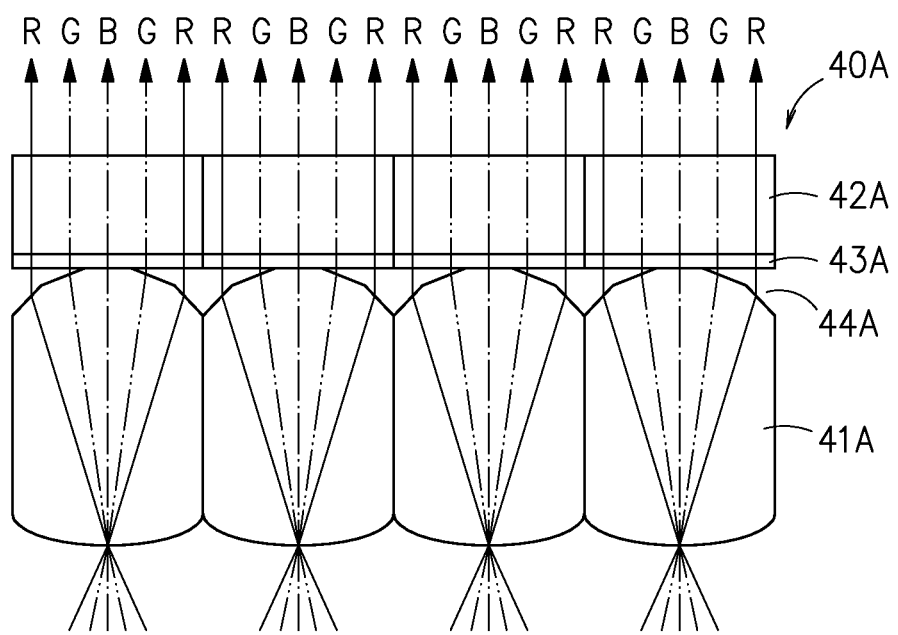
FIG. 10 is a side view of a light splitting module according to a second embodiment of the invention.

Please refer to FIG. 10, which is a side view of a light splitting module according to a second embodiment of the invention. The light splitting module 40A shown in FIG. 10 also includes a first beam splitting plate 41A and a liquid crystal layer 42A, whereas the first beam splitting plate 41A is similarly adhered to the liquid crystal layer 42A by the use of an adhesive 43A. The difference between the embodiment shown in FIG. 10 and that shown in FIG. 9 is that: the adhesive 43A used in the embodiment of FIG. 10 is a flake-like dry gel, by that there can be gaps 44A formed between the adhesive 43A and the first beam splitting plate 41A whereas each gap 44A is formed in a manner selected from the group consisting of: the gap is vacuumed, the gap is filled with air, and the combination thereof.

Figure 11:
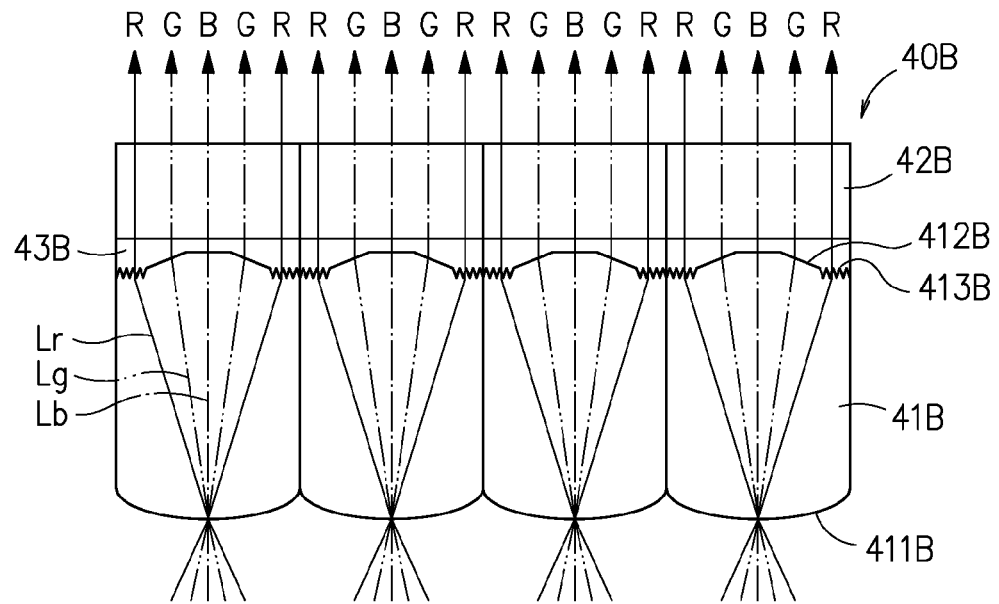
FIG. 11 is a side view of a light splitting module according to a third embodiment of the invention.

Please refer to FIG. 11, which is a side view of a light splitting module according to a third embodiment of the invention. The light splitting module 40B shown in FIG. also includes a first beam splitting plate and a liquid crystal layer 42B, whereas the first beam splitting plate 41B is similarly adhered to the liquid crystal layer 42B by the use of an adhesive 43B; and also the first beam splitting plate 41B is formed with a third light incident surface 411B and a third light emergence surface 412B. The difference between the embodiment shown in FIG. 11 and that shown in FIG. 9 is that: the third light emergence surface 412B has a portion of its surface area being formed with refractive microstructures 413B at positions corresponding to the optical path of the third incident beams Lr that they are functioned for deflecting the optical path of the incident beams Lr.

Figure 12:
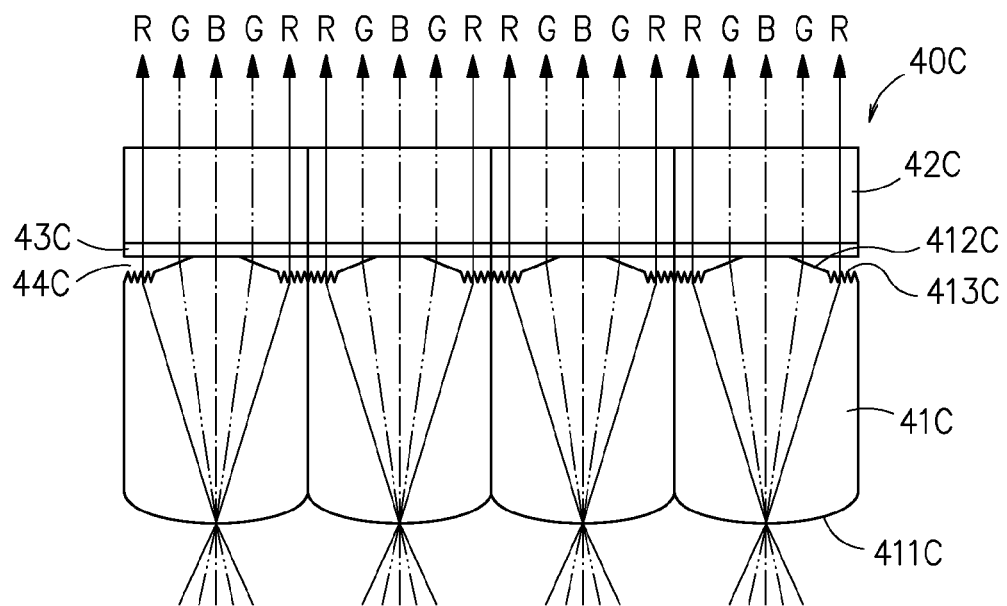
FIG. 12 is a side view of a light splitting module according to a fourth embodiment of the invention.

Please refer to FIG. 12, which is a side view of a light splitting module according to a fourth embodiment of the invention. The light splitting module 40C shown in FIG. also includes a first beam splitting plate 41C and a liquid crystal layer 42C, whereas the first beam splitting plate 41C is similarly adhered to the liquid crystal layer 42C by the use of an adhesive 43C; the first beam splitting plate 41C is formed with a third light incident surface 411C and a third light emergence surface 412C; and also the third light emergence surface 412C has a portion of its surface area being formed with refractive microstructures 413C. The difference between the embodiment shown in FIG. 12 and that shown in FIG. 11 is that: the adhesive 43C used in the embodiment of FIG. is a flake-like adhesive, by that there can be gaps 44C formed between the adhesive 43C and the first beam splitting plate 41C whereas each gap 44C is formed in a manner selected from the group consisting of: the gap is vacuumed, the gap is filled with air, and the combination thereof.

Figure 13:
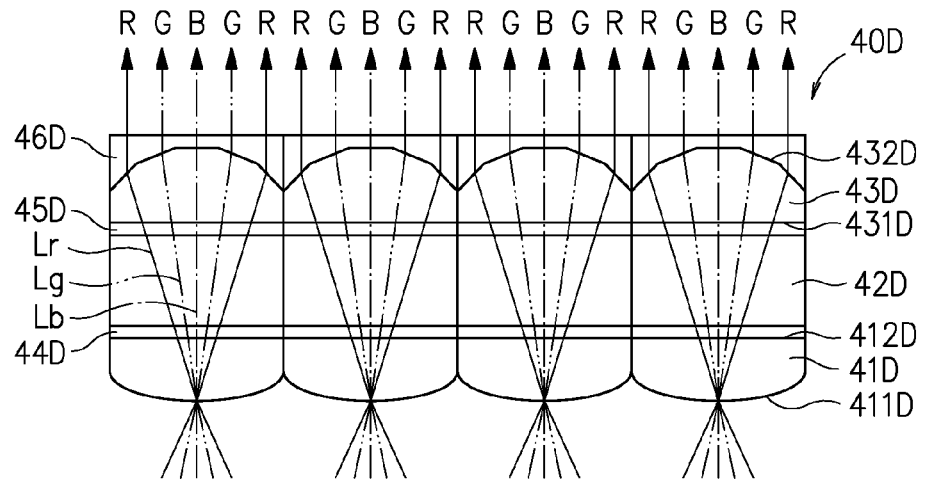
FIG. 13 is a side view of a light splitting module according to a fifth embodiment of the invention.

Please refer to FIG. 13, which is a side view of a light splitting module according to a fifth embodiment of the invention. The light splitting module 40D shown in FIG. 13 is configured with a first beam splitting plate 41D, a liquid crystal layer 42D and a second beam splitting plate 43D, whereas the liquid crystal layer 42D are sandwiched between the first and the second beam splitting plates 41D, while being adhered thereto by the use of adhesives 44D and 45D. In this embodiment, the refractive indexes of the first beam splitting plate 41D and the second beam splitting plate 43D are ranged between 1.35 and 1.65. Moreover, the first beam splitting plate 41D is formed with a third light incident surface 411D and a third light emergence surface 412D, and the second beam splitting plate 43D is formed with a fourth light incident surface 431D and a fourth light emergence surface 432D, in that the third light incident surface 411D is formed with periodic spherical refraction microstructures while the fourth light emergence surface 432D is formed with periodic refraction microstructures. Thereby, the first incident beam Lb, the second incident beams Lg and the third incident beams Lr from the first light emergence surface 32 of the light guide module 30 are projected onto the third light incident surface 411D where they are converged and then being directed to enter the liquid crystal layer 42 in respective, and then projected toward the fourth light emergence surface 432D, at which the optical paths of the first incident beam Lb, the second incident beams Lg and the third incident beams Lr are deflected for enabling the same to be discharged thereout in a direction parallel with the normal direction of the first light emergence surface 32 of the light guide module 30. In addition, there is an adhesive 46D disposed on the fourth light emergence surface 432D. It is noted that any of the aforesaid adhesives 44D, 45D and 46D can be a dry gel or wet gel. In this embodiment, the adhesive 46D is a type of wet gel. As the first incident beam Lb, the second incident beams Lg and the third incident beams Lr are projected passing through the first beam splitting plate 41D, the liquid crystal layer 42D and the second beam splitting plate 43D in sequence, the light splitting effect achieved in the present embodiment is similar to those being achieved by those disclosed in FIG. 9 to FIG. 12.

Figure 14:
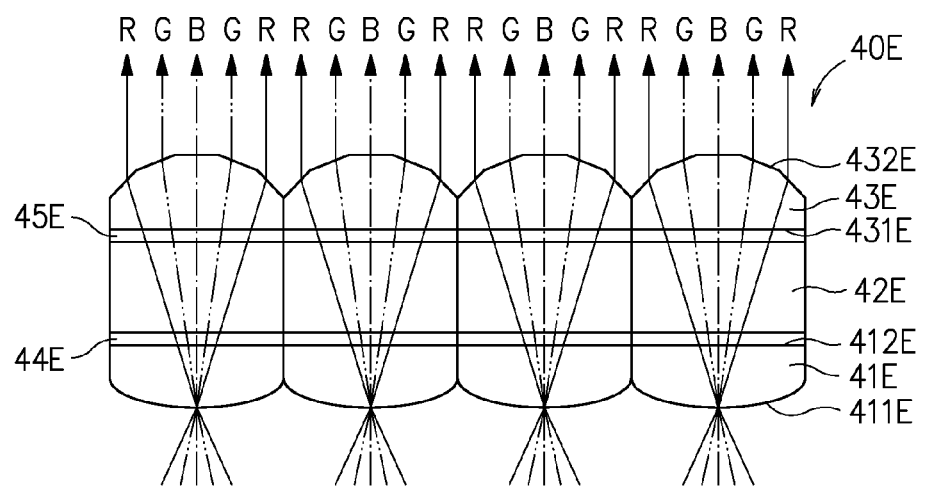
FIG. 14 is a side view of a light splitting module according to a sixth embodiment of the invention.

Please refer to FIG. 14, which is a side view of a light splitting module according to a sixth embodiment of the invention. The light splitting module 40E shown in FIG. 14 is configured with a first beam splitting plate 41E, a liquid crystal layer 42E and a second beam splitting plate 43E, whereas the liquid crystal layer 42E are sandwiched between the first and the second beam splitting plates 41E, 43E while being adhered thereto by the use of adhesives 44E and 45E; and the first beam splitting plate 41E is formed with a third light incident surface 411E and a third light emergence surface 412E, while the second beam splitting plate 43E is formed with a fourth light incident surface 431E and a fourth light emergence surface 432E. The difference between the embodiment shown in FIG. 14 and that shown in FIG. 13 is that: there is no adhesive formed on the fourth light emergence surface of the second beam splitting plate 43E.

Figure 15:
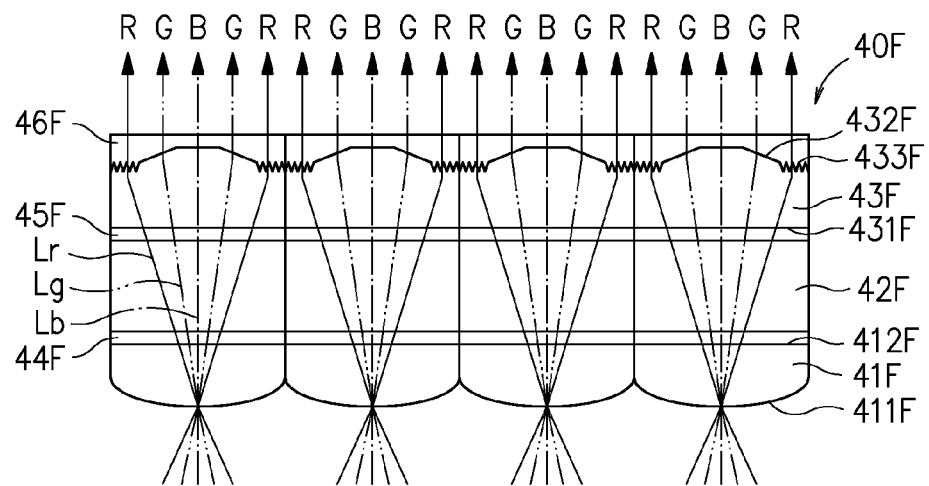
FIG. 15 is a side view of a light splitting module according to a seventh embodiment of the invention.
Figure 16:
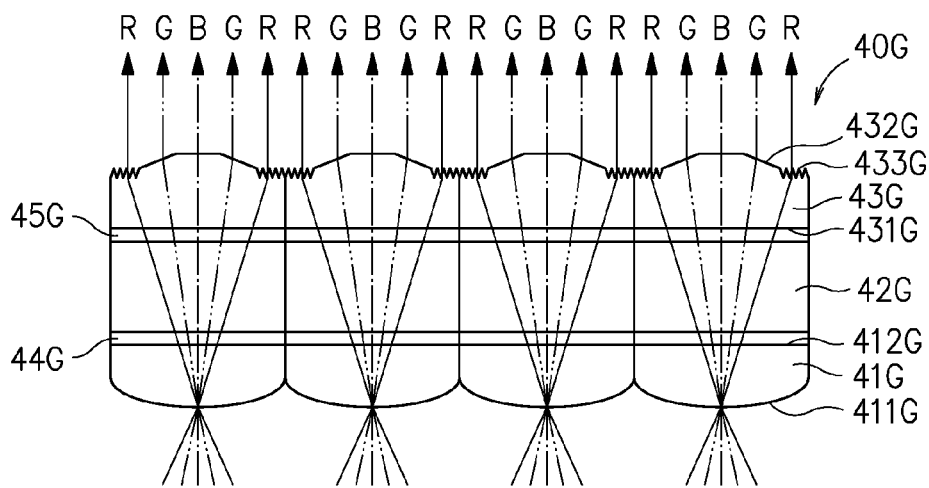
FIG. 16 is a side view of a light splitting module according to an eighth embodiment of the invention.

Please refer to FIG. 15, which is a side view of a light splitting module according to a seventh embodiment of the invention. The light splitting module 40F shown in FIG. 15 is configured with a first beam splitting plate 41F, a liquid crystal layer 42F and a second beam splitting plate 43F, whereas the liquid crystal layer 42F are sandwiched between the first and the second beam splitting plates 41F, 43F while being adhered thereto by the use of adhesives 44F and 45F; and the first beam splitting plate 41F is formed with a third light incident surface 411F and a third light emergence surface 412F, while the second beam splitting plate 43F is formed with a fourth light incident surface 431F and a fourth light emergence surface 432F; and there is an adhesive 46F formed on the fourth light emergence surface 42F. The difference between the embodiment shown in FIG. 15 and that shown in FIG. 13 is that: the fourth emergence surface 432F has a portion of its surface area being formed with refractive microstructures 433F at positions corresponding to the optical path of the third incident beams Lr that they are functioned for deflecting the optical path of the incident beams Lr as those disclosed in FIG. 14. In addition, by waiving the adhesive 46F in the seventh embodiment, another light splitting module is formed as the eighth embodiment shown in FIG. 16. In FIG. 16, a light splitting module 40G is configured with a first beam splitting plate 41G, a liquid crystal layer 42G and a second beam splitting plate 43G, whereas the liquid crystal layer 42G are sandwiched between the first and the second beam splitting plates 41G, 43G while being adhered thereto by the use of adhesives 44G and 45G; and the first beam splitting plate 41G is formed with a third light incident surface 411G and a third light emergence surface 412G, while the second beam splitting plate 43G is formed with a fourth light incident surface 431G and a fourth light emergence surface 432G; but there is no adhesive formed on the fourth light emergence surface 432G of the second beam splitting plate 43G.

To sum up, the preset disclosure provides a composite color separation system, which is an assembly of three optical modules of specifically designed structures. The three optical modules are a light control module, a light guide module and a light splitting module, wherein the light control module, being configured with light sources capable of emitting beams of different wavelengths, is able to control the beams of different wavelengths to enter the light guide module by different incident angles; the light guide module is functioned to guide those incident beams toward its light emergence surface for discharging and entering the light splitting module; and the light splitting module is provided for enabling the received beams to travel in a specified direction or respectively toward a specified location. Therefore, the color separation system of the present disclosure is capable of acting in replacement of the conventional color filters (CF) used in optical devices, such as display panels, image sensors and color camcorders, for its simplicity and high optical efficiency.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:
1. A composite color separation system, comprising:
a light control module, configured with at least one lighting unit and at least one lens unit, while enabling each lighting unit to be formed as an array of a plurality of symmetrically disposed lighting elements and each array to be composed of at least two types of lighting elements so as to enable each lighting unit to emit correspondingly at least two types of incident beams of different wavelengths to its corresponding lens unit and then out of the light control module;
a light guide module, configured with a first light incident surface, a light guide structure and a first light emer- gence surface in a manner that the first light incident surface is provided for receiving the plural incident beams from the light control module;

and the light guide structure is used for guiding the plural incident beams to the first light emergence surface where they are discharged out of the light guide module; and a light splitting module, for receiving and splitting the plural incident beams from the light guide module and then projecting the split beams out of the light splitting module, wherein each of the arrays comprises:

at least one first lighting element, each capable of emitting a first incident beam featuring by a first wavelength; and at least two second lighting elements, each capable of emitting a second incident beam featuring by a second wavelength while enabling the at least two second lighting elements to be disposed symmetrically at two opposite sides of the at least one first lighting element.

2. The composite color separation system of claim 1, wherein each of the arrays further comprises:

at least two third lighting elements, each capable of emitting a third incident beam featuring by a third wavelength while enabling the at least two third lighting elements to be disposed symmetrically at two opposite sides of the at least one first lighting element and at two opposite positions outside the at least two second lighting elements.

3. The composite color separation system of claim 1, wherein each of the plural lighting elements is a light emitting diode (LED); and there are at least two types of LED in each array that are selected from the group consisting of: red-light LED, blue-light LED and green-light LED.

4. The composite color separation system of claim 1, wherein the incident angle of each of the plural incident beams with respect to the optical axis of its corresponding lens unit is ranged between −45 degrees and +45 degrees.

5. The composite color separation system of claim 1, wherein each lens unit configured with a second light incident surface and a second light emergence surface in a manner that the second light incident surface is provided for receiving the plural incident beams; and the second light emergence surface is provided for the plural incident beam to be projected out of the lens unit therefrom.

6. The composite color separation system of claim 5, wherein there is a gap formed between the second light emergence surface and the first light incident surface while enabling the gap to be filled with air.

7. The composite color separation system of claim 1, wherein the light control module further comprises:

a first reflective structure, disposed covering a top surface and a bottom surface of the light control module for reflecting the plural incident beams.

8. The composite color separation system of claim 1, wherein the light guide module further comprises:

a second reflective structure, for reflecting the plural incident beams that enter the light guide module from the first light emergence surface back to the first light emergence surface.

9. The composite color separation system of claim 8, wherein the second reflective structure is disposed on a surface of the light guide module that is opposite to and the first light emergence surface.

10. The composite color separation system of claim 1, wherein the light splitting module is further configured with a first beam splitting plate having periodic microstructures formed thereon and a liquid crystal layer while enabling the plural incident beams from the light guide module to be converged by the first beam splitting plate while deflecting the optical paths thereof toward the liquid crystal layer in positions respectively corresponding with multiple sub-pixels thereof, and thereafter, enabling those to be discharged thereout in a direction parallel with the normal direction of the first light emergence surface of the light guide module.

11. The composite color separation system of claim 10, wherein the first beam splitting plate further comprise:

a third light incident surface, formed with periodic spherical refraction microstructures, for converging the plural incident beams from the light guide module; and a third light emergence surface, formed with periodic refraction microstructures, for deflecting the plural incident beams toward the liquid crystal layer in positions respectively corresponding with multiple sub-pixels thereof.

12. The composite color separation system of claim 1, wherein the light splitting module further comprise:

a first beam splitting plate, further comprises:

a third light incident surface, formed with periodic spherical refraction microstructures, for converging the plural incident beams from the light guide module; and a third light emergence surface;

a second beam splitting plate, further comprises:

a fourth light incident surface; and a fourth light emergence surface, formed with periodic refraction microstructures, for deflecting the optical paths of the plural incident beams and thus enabling those to be discharged thereout in a direction parallel with the normal direction of the first light emergence surface of the light guide module; and a liquid crystal layer, sandwiched between the first beam splitting plate and the second beam splitting plate.

13. The composite color separation system of claim 1, further comprising:

a reflective structure, disposed at a position between the light control module and the light guide module, for receiving and reflecting the plural incident beams from the light control module to the first light incident surface of the light guide module.

* * * * *